United States Patent [19]
Eby

[11] 3,727,813
[45] Apr. 17, 1973

[54] EQUIPMENT SUPPORTING RACK FOR A POLICE CAR

[76] Inventor: George W. Eby, 1015 Molalla Ave., Oregon City, Oreg. 97045

[22] Filed: Aug. 10, 1971

[21] Appl. No.: 170,473

[52] U.S. Cl............224/42.42 R, 108/44, 224/42.43
[51] Int. Cl. .............................................B60m 11/00
[58] Field of Search......................224/42.42, 42.43, 224/29 R; 206/19.5 R, 19.5 B; 108/44, 6, 107, 48; 211/148; 296/37, 1 R

[56] References Cited

UNITED STATES PATENTS

| | | | |
|---|---|---|---|
| 3,589,577 | 6/1971 | Basinger | 108/44 X |
| 2,578,238 | 12/1951 | Goldman | 224/42.42 R |
| 1,876,172 | 9/1932 | Ruddy | 108/6 |
| 3,550,001 | 12/1970 | Hanley | 296/1 R |

Primary Examiner—Gerald M. Forlenza
Assistant Examiner—Jerold M. Forsberg
Attorney—Berman, Davidson & Berman

[57] ABSTRACT

An article supporting rack intended to be installed between the front seat and the dashboard of a police car or similar emergency vehicle. The rack consists of a short vertical side bar secured on the top of the floor hump of the vehicle and a longer vertical side bar secured to the floor board adjacent the hump, the top ends of the vertical side bars being adjacent to the vehicle dashboard. A plurality of shelves are mounted between the side bars for supporting radio equipment and the like.

8 Claims, 3 Drawing Figures

PATENTED APR 17 1973 3,727,813

INVENTOR.
GEORGE W. EBY,
BY
Berman, Davidson & Berman,
ATTORNEYS.

EQUIPMENT SUPPORTING RACK FOR A POLICE CAR

This invention relates to article-supporting devices for use in motor vehicles, and more particularly to a supporting rack or console intended to be mounted between the front seat and dashboard of an emergency vehicle, such as a police car, or the like, for supporting radio equipment, radar equipment, siren devices, or similar articles which are commonly employed in police or other emergency vehicles.

A main object of the invention is to provide an improved supporting rack for a police car or other similar emergency vehicle, the rack device being intended to be mounted in the forward portion of the vehicle between the front seat and dashboard thereof and being intended to be mounted so as to conform with the floor hump or longitudinal raised portion of the vehicle floor in this region, the device being relatively simple in construction, being easy to install, and providing a substantial amount of space for accommodating and supporting various articles of equipment, such as radio apparatus, or the like.

A further object of the invention is to provide an improved article-supporting rack device adapted to be mounted in the forward portion of a police car or similar emergency vehicle, the rack device involving inexpensive components, being relatively compact in size, being sturdy in construction, and being readily accessible to the occupants of the vehicle.

Further objects and advantages of the invention will become apparent from the following description and claims, and from the accompanying drawings, wherein:

Figure 1:
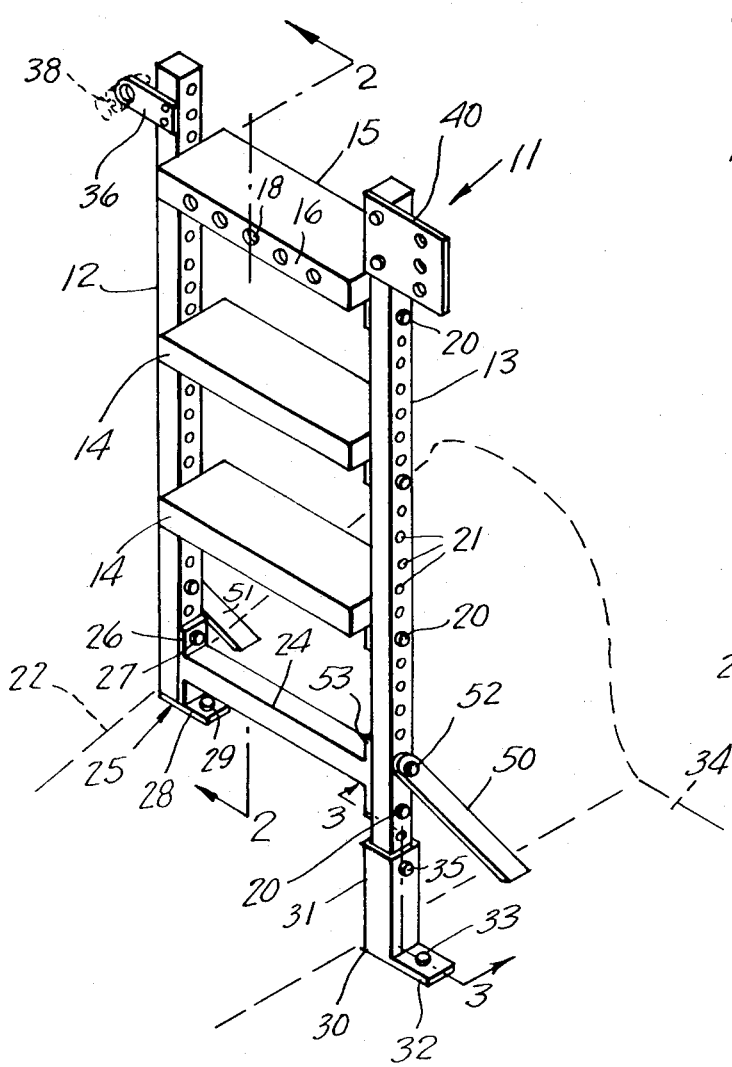
FIG. 1 is a perspective view showing an improved rack device according to the present invention and illustrating the manner in which it interfits with the floor hump of a motor vehicle.

Referring to the drawings, 11 generally designates an improved supporting rack constructed in accordance with the present invention. The supporting rack 11 comprises a first relatively short side bar 12 and a second substantially longer side bar 13 which are connected by a plurality of spaced transversely extending shelves 14, the uppermost shelf, shown at 15, having an apertured front flange portion 16 in which control switches 17, or the like, are adapted to be mounted, the apertures shown at 18 being suitably dimensioned to receive such switch devices.

Figure 2:
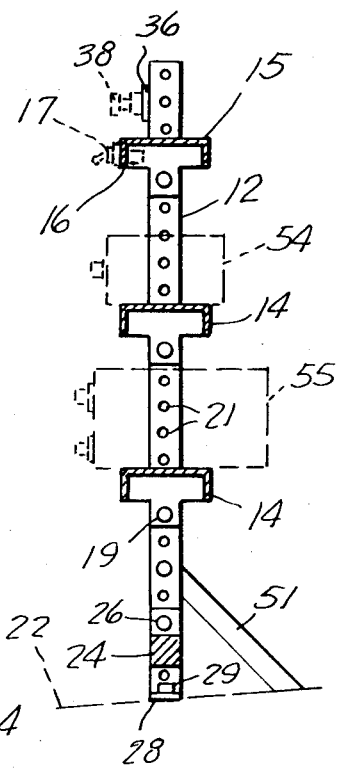
FIG. 2 is a vertical transverse cross-sectional view taken substantially on the line 2—2 of FIG. 1.

As shown in FIG. 2, the shelf members 14 and 15 are preferably channel-shaped in transverse cross section and are provided with depending apertured end tabs 19 which are connected to the respective side bars 12 and 13 by fastening bolts 20, the shelves being pivotally adjustable between the side bars 12 and 13, and the heights of the shelves being variable by the provision of vertically spaced bolt holes 21 in the side bars 12 and 13. Thus, the shelves may be secured in a selected position between the side bars by engaging the bolts 20 through the corresponding bolt holes 21 in the side bars and locking the shelves in position by means of suitable nuts provided on the bolts.

The rack device 11 is intended to be mounted between the front seat and dashboard of an emergency vehicle, such as a police car, or the like. In this region the vehicle has the conventional floor hump 22, and the rack device 11 must interfit therewith. Thus, the shorter side bar 12 is secured to the top of the floor hump 22 in the manner illustrated in FIGS. 1 and 3. A transversely extending cross bar 24 is provided between the vertical side bars 12 and 13, the cross bar being formed at its left end, as viewed in FIG. 1, with an integral inverted T-shaped bottom member 25 defining a corner recess receiving the lower end of side bar 12 and having an upstanding flange portion 26 with an aperture for a fastening bolt 27 engageable through one of the bolt holes 21 of side bar 12. The member 25 also has a horizontally extending apertured flange portion 28 which extends inwardly beneath the main body of the cross bar 24 and which is adapted to receive a fastening bolt 29 for securing the member 25 to the floor hump 22.

The lower end of the longer vertical side bar 13 is received in a sleeved bracket 30 comprising a square vertical sleeve portion 31 having a horizontal base flange 32 which is secured by means of a bolt 33 to the vehicle floor board 34, as shown in FIG. 1.

Figure 3:
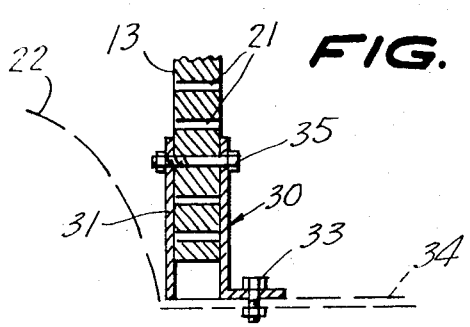
FIG. 3 is an enlarged cross-sectional detail view taken substantially on the line 3—3 of FIG. 1.

As shown in FIGS. 1 and 3, the side bars 12 and 13 are preferably of square cross-sectional shape, and the bracket 30 is likewise of square shape dimensioned to telescopically receive the lower portion of the side bar 13. The upstanding opposite walls of the bracket sleeve 31 are suitably apertured to receive a fastening bolt 35 engageable through a selected bolt hole 21 of side bar 13 in the manner illustrated in FIG. 3.

The top end of the side bar 12 is provided with a laterally extending apertured bracket 36 adapted to receive a cigar lighter 38, and the top end of the upstanding side bar 13 is provided with a laterally extending bracket plate 40 apertured to receive hardware associated with a shotgun supporting assembly or similar weapon-supporting assembly.

The bolt holes 21 are preferably drilled and tapped so that they may be threadedly engaged by the bolts 20 without requiring use of nuts. Thus, the depending tabs 19 of the shelves 14 and 15 may be fastened by engaging the bolts through the apertures of the tabs at the inside area beneath the shelves and tightening the bolts beneath the shelves to secure the tabs to the inside wall surfaces of the upstanding side bars. The shelves are pivotally adjustable so that they may be fastened at any desired angle of adjustment.

Respective struts 50 and 51 may be fastened to the upstanding side bars 13 and 12 in the manner illustrated in FIG. 1, the struts being secured to the side bars 13 and 12 by suitable fastening bolts 52 and extending downwardly and forwardly from the side bars to engage the top of hump 22 and floor board 34, respectively, as illustrated in FIG. 1.

It will be noted that the square cross bar 24 is provided at its right end, as shown in FIG. 1, with an integral securing flange 53 which is suitably rigidly fastened to the adjacent face of the side bar 13. Thus, the flange 53 may project above and below the main body portion of the cross bar 24 and may be secured below the main body portion by a bolt 20 and above said main body portion by the same fastening bolt 52 which is employed to secure strut 50 to side bar 13.

In using the rack device, various articles of equipment, such as radio or radar equipment, designated diagrammatically in FIG. 2 at 54 and 55, may be mounted on the shelves 14, and control switches 17 for such equipment or for other apparatus employed in the vehicle, such as auxiliary lamps, or the like, may be mounted in the apertures 18 of flange 16 of the top shelf 15 in the manner above described. As above mentioned, additional articles, such as a cigarette lighter 38, may be supported on the rack device, for example, in the laterally extending bracket member 36, and the laterally extending bracket member 40 may be employed to receive hardware employed with a rifle or shotgun supporting device.

While a specific embodiment of an improved article-supporting rack device for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a motor vehicle having a floor board and a longitudinally extending floor hump rising from the floor board in the forward portion of its passenger compartment, a first upstanding side bar rising from the top of said floor hump, a second upstanding side bar rising from the floor board adjacent said floor hump, a rigid cross bar between the lower portions of said side bars, an integral inverted T-shaped member on one end of said cross bar defining a corner recess receiving the lower end of said first side bar and having an upper upstanding flange portion, fastening means engaged through said upper flange portion and said first side bar, said inverted T-shaped member having a horizontally extending bottom flange portion extending beneath the cross bar, fastening means securing said bottom flange portion to the floor hump, an integral vertically projecting securing flange on the other end of said cross bar, fastening means securing said vertically projecting securing flange to said second upstanding side bar, a bracket member secured to the floor board and having an upstanding sleeve element telescopically receiving the lower end portion of said second side bar, fastening means securing said sleeve element to said lower end portion of the second side bar, a plurality of article supporting shelf members extending between said side bars, and means securing the ends of the shelf members to the respective upstanding side bars, whereby to define an article-supporting rack in said forward portion of the vehicle passage compartment.

2. The structural combination of claim 1, and wherein said shelf members are provided at their ends with depending apertured securing lugs, and the means securing the ends to the side bars comprises respective fasteners engaged through the apertured lugs and secured in the side bars.

3. The structural combination of claim 2, and wherein the side bars are provided with spaced holes in which the fasteners can be selectively engaged, whereby the shelf members are adjustable in height.

4. The structural combination of claim 2, and wherein the fasteners are transversely aligned, whereby the shelf members are angularly adjustable.

5. The structural combination of claim 4, and wherein said shelf members are substantially channel-shaped in cross-section.

6. The structural combination of claim 5, and wherein at least one of the shelf members has a flange provided with apertures adapted to receive control devices.

7. The structural combination of claim 6, and respective inclined struts secured to the side bars and engaging the top of the floor hump and the floor board.

8. The structural combination of claim 7, and additional article-supporting means secured to the top portion of at least one of the upstanding side bars.

* * * * *